United States Patent
Fowe et al.

(10) Patent No.: US 10,445,610 B2
(45) Date of Patent: Oct. 15, 2019

(54) METHOD, APPARATUS, AND COMPUTER PROGRAM PRODUCT FOR DETERMINING VEHICLE LANES OF A ROAD SEGMENT BASED ON RECEIVED PROBE DATA

(71) Applicant: HERE Global B.V., Eindhoven (NL)

(72) Inventors: James Fowe, Chicago, IL (US); Filippo Pellolio, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 160 days.

(21) Appl. No.: 15/654,066

(22) Filed: Jul. 19, 2017

(65) Prior Publication Data
US 2019/0026591 A1 Jan. 24, 2019

(51) Int. Cl.
| | |
|---|---|
| *G06K 9/00* | (2006.01) |
| *G06K 9/46* | (2006.01) |
| *G06T 7/12* | (2017.01) |
| *G06K 9/62* | (2006.01) |

(52) U.S. Cl.
CPC ......... *G06K 9/4609* (2013.01); *G06K 9/0063* (2013.01); *G06K 9/00798* (2013.01); *G06K 9/6218* (2013.01); *G06T 7/12* (2017.01); *G06T 2207/30256* (2013.01)

(58) Field of Classification Search
CPC .. G08G 1/0112; G08G 1/0129; G08G 1/0133; G08G 1/0141; G08G 1/167; G08G 1/0125; G01C 21/32; G01C 21/3492; G01C 21/3658; G01C 21/30; G06K 9/00798
See application file for complete search history.

(56) References Cited

U.S. PATENT DOCUMENTS

| | | |
|---|---|---|
| 6,385,539 B1 | 5/2002 | Wilson et al. |
| 9,355,321 B2 | 5/2016 | Wujcicki |
| 2009/0138497 A1* | 5/2009 | Zavoli .................. G09B 29/106 |

(Continued)

FOREIGN PATENT DOCUMENTS

WO WO-2010/147730 12/2010

OTHER PUBLICATIONS

Chen, Y.et al. "Probabilistic Modeling of Traffic Lanes From GPS Traces." Presented at the Proceedings of the 18th SIGSPATIAL International Conference on Advances in Geographic Information Systems; San Jose, California; Nov. 2010; pp. 81-88.

(Continued)

*Primary Examiner* — Li Liu
(74) *Attorney, Agent, or Firm* — Alston & Bird LLP

(57) ABSTRACT

A method is provided to determine a number of vehicle travel lanes along a road segment. A method may include: receiving probe data from a plurality of probes, where the probe data includes probe data points having location and heading; matching the probe data to a road segment to generate map-matched probe data; analyzing the probe data relative to the road segment to establish a multi-modal distribution of probe data representing a distance of the probe data from a predefined reference position of the road segment; determining a number of vehicle travel lanes of the road segment based on peaks in the established multi-modal distribution being associated with individual lanes; and providing the determined number of vehicle travel lanes and the associated road segment to a map services database for lane-level route guidance.

20 Claims, 8 Drawing Sheets

(56) References Cited

U.S. PATENT DOCUMENTS

| | | | |
|---|---|---|---|
| 2012/0004845 A1* | 1/2012 | Kmiecik | G01C 21/32 701/445 |
| 2012/0095682 A1* | 4/2012 | Wilson | G01C 21/32 701/532 |
| 2015/0170514 A1* | 6/2015 | Stenneth | G08G 1/0125 701/117 |
| 2015/0262480 A1* | 9/2015 | Fowe | G01C 21/3492 701/117 |
| 2016/0039413 A1* | 2/2016 | Eichhorn | B60W 50/14 701/26 |
| 2016/0167582 A1* | 6/2016 | Chen | G06K 9/00798 348/148 |
| 2016/0171893 A1 | 6/2016 | Chen et al. | |
| 2017/0004707 A1 | 1/2017 | Fowe et al. | |

OTHER PUBLICATIONS

Van Winden et al. "Automatic Update of Road Attributes by Mining GPS Tracks." Transactions in GIS, vol. 20, Issue 5; Oct. 2016; pp. 664-683.

Zhang, L. et al. "Integration of GPS Traces with Road Map." Presented at the Proceedings of the 18th SIGSPATIAL International Conference on Advances in Geographic Information Systems; San Jose, California; Nov. 2010; pp. 17-22.

* cited by examiner

METHOD, APPARATUS, AND COMPUTER PROGRAM PRODUCT FOR DETERMINING VEHICLE LANES OF A ROAD SEGMENT BASED ON RECEIVED PROBE DATA

TECHNOLOGICAL FIELD

An example embodiment of the present invention relates to determining vehicle lanes of a road segment, and more particularly, to analyzing probe data from a plurality of probes to establish a multi-modal distribution of probe data along a road segment, and to use the multi-modal distribution to establish the number of lanes along the road segment.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

Traffic data that is provided on digital maps is generally based on crowd-sourced data from mobile devices or probe data. The traffic data is typically reflective of a collective group of mobile devices traveling along a road segment, with each road segment having a certain number of lanes that may not be known to a map database. The determination of a number of lanes along a road segment in each direction of travel may facilitate greater navigation granularity and enable more detailed analysis of traffic along the road segment on a per-lane basis.

BRIEF SUMMARY

A method, apparatus, and computer program product are provided in accordance with an example embodiment for gathering probe data and using the gathered data to establish a number of lanes along a road segment using a multi-modal distribution of the probe data points. According to an example embodiment described herein, a map services provider system may be provided. The system may include a memory configured to receive probe data points from a plurality of probes, wherein the probe data includes at least one of heading information and location information for each probe data point. The system may also include a processor configured to: match the probe data to a road segment to generate map-matched probe data; analyze the probe data relative to the road segment to establish a multi-modal distribution of probe data representing a distance of the probe data from a predefined reference position of the road segment; determine a number of vehicle travel lanes of the road segment based on peaks in the established multi-modal distribution being associated with individual lanes; and provide the determined number of vehicle travel lanes and the associated road segment to a map services database for lane-level route guidance. The multi-modal distribution of probe data may be determined by a multi-modality detection and clustering algorithm.

According to some embodiments, the processing circuitry configured to analyze the probe data relative to the road segment to establish a multi-modal distribution of probe data representing a distance of the probe data from a predefined reference position of the road segment uses a multimodality detection and clustering algorithm with a first magnitude parameter. The processing circuitry may be further configured to analyze the probe data relative to the road segment to establish a multi-modal distribution of probe data representing a distance of the probe data from a predefined reference position of the road segment using the multimodality detection and clustering algorithm with a second magnitude parameter, different from the first magnitude parameter. The processing circuitry configured to match probe data to a road segment may include processing circuitry configured to: divide the road segment into sub-segments, where each sub-segment is defined between two consecutive shape points; determine distance between each probe data point map-matched to the road segment and each of the sub-segments of the road segment; for each probe data point, select the shortest distance from among the distance between that probe data point and the sub-segments of the road segment; and determine a value for the shortest distance each probe data point, where the shortest distance is positive in response to being disposed on a first side of the sub-segment and negative in response to being disposed on the opposite side of the sub-segment. The processing circuitry configured to analyze the probe data relative to the road segment may include processing circuitry configured to generate a distribution of probe data points from the road segment, where the shortest distance from the road segment for each probe data point is a lane distance from the centerline of the road segment, and establish multi-modal trends in the distribution of probe data points.

According to some embodiments, the processing circuitry configured to analyze the probe data relative to the road segment to establish a multi-modal distribution of probe data representing a distance of the probe data from a predefined reference position of the road segment may be further configured to: divide the road segment into a plurality of road sub-segments; and for each road sub-segment, analyze the probe data relative to the road sub-segment to establish a multi-modal distribution of probe data representing a distance of the probe data from a predefined reference position of the road sub-segment. The processing circuitry configured to analyze the probe data relative to the road sub-segment to establish a multi-modal distribution of probe data representing a distance of the probe data from a predefined reference position of the road sub-segment may include processing circuitry configured to: analyze each road sub-segment using a multimodal distribution clustering algorithm and a series of different magnitude values to establish a number of lanes and a confidence value for each combination of road sub-segment and magnitude value; and establish a number of lanes of the road segment based on a most represented value for the number of lanes from among all combinations of the road sub segments and the magnitude values.

Embodiments presented herein may provide an apparatus including at least one processor and at least one computer program code. The at least one memory and computer program code configured to, with the processor, cause the apparatus to at least: receive probe data from a plurality of probes, where the probe data includes location and heading; match the probe data to a road segment to generate map-matched probe data including a plurality of map-matched probe data points; divide the road segment into a plurality of sub-segments, where each sub-segment includes a predefined reference; determine, for each probe data point, a lane distance from the predefined reference of each of the plurality of sub-segments; establish, for each probe data point, the shortest lane distance as the probe data point lane distance for the respective probe data point relative to the road segment; analyze the probe data relative to the road segment to generate a multi-modal distribution of the probe data points representing a distance of the probe data from a predefined reference position of the road segment based on the probe data point lane distance for each probe data point; determine a number of vehicle travel lanes of the road segment based on the probe data point lane distance from the predefined reference and the multi-modal distribution; and provide the determined number of vehicle travel lanes and the associated road segment to a map services database for lane-level route guidance.

Causing the apparatus to match each probe data point to an individual lane of the road segment based on the lane distance from the predefined reference and the multi-modal distribution may include establishing individual lanes of the road segment based on the peaks of the multi-modal distribution using a multimodality detection and clustering algorithm. Causing the apparatus to divide the road segment into a plurality of sub-segments may include dividing the road segment into a plurality of sub-segments where each sub-segment is defined between two consecutive shape points along the road segment. Causing the apparatus to analyze the probe data relative to the road segment to establish a multi-modal distribution of probe data representing a distance of the probe data from a predefined reference position of the road segment uses a multimodality detection and clustering algorithm with a first magnitude parameter, where the apparatus may be further caused to analyze the probe data relative to the road segment to establish a multi-modal distribution of probe data representing a distance of the probe data from a predefined reference position of the road segment using the multimodality detection and clustering algorithm with a second magnitude parameter, different from the first magnitude parameter.

According to some embodiments, causing the apparatus to analyze the probe data relative to the road segment to establish a multi-modal distribution of probe data representing a distance of the probe data from a predefined reference position of the road segment may include, for each road sub-segment, causing the apparatus to analyze the probe data relative to the road sub-segment to establish a multi-modal distribution of probe data representing a distance of the probe data from a predefined reference position of the road sub-segment. Causing the apparatus to analyze the probe data relative to the road sub-segment to establish a multi-modal distribution of probe data representing a distance of the probe data from a predefined reference position of the road sub-segment may include causing the apparatus to: analyze each road sub-segment using a multimodal distribution clustering algorithm and a series of different magnitude values to establish a number of lanes and a confidence value for each combination of road sub-segment and magnitude value; and establish a number of lanes of the road segment based on a most represented value for the number of lanes from among all combinations of the road sub-segments and the magnitude values.

Embodiments provided herein may include a method including: receiving probe data from a plurality of probes, where the probe data includes probe data points having location and heading; matching the probe data to a road segment to generate map-matched probe data; analyzing the probe data relative to the road segment to establish a multi-modal distribution of probe data representing a distance of the probe data from a predefined reference position of the road segment; determining a number of vehicle travel lanes of the road segment based on peaks in the established multi-modal distribution being associated with individual lanes; and providing the determined number of vehicle travel lanes and the associated road segment to a map services database for lane-level route guidance. The multi-modal distribution of probe data may be determined by a multimodality detection and clustering algorithm.

According to some embodiments, analyzing the probe data relative to the road segment to establish a multi-modal distribution of probe data representing a distance of the probe data from a predefined reference position of the road segment may use a multimodality detection and clustering algorithm with a first magnitude parameter, and the method may include analyzing the probe data relative to the road segment to establish a multi-modal distribution of probe data representing a distance of the probe data from a predefined reference position of the road segment using a second magnitude parameter, different from the first magnitude parameter. Matching the probe data to a road segment may include: dividing the road segment into sub-segments, where each sub-segment may be defined between two consecutive shape points; determining distances between each probe data point map-matched to the road segment and each of the sub-segments of the road segment; for each probe data point, selecting the shortest distance from among the distance between that probe data point and the sub-segments of the road segment; and determining a value for the shortest distance of each probe data point, where the shortest distance is positive in response to being disposed on a first side of the sub-segment and negative in response to being disposed on an opposite side of the sub-segment. Analyzing the probe data point relative to the road segment may include: generating a distribution of probe data points from the road segment, where the shortest distance from the road segment for each probe data point is a lane distance from the centerline of the road segment; and establishing multi-modal trends in the distribution of probe data points.

According to some embodiments, analyzing the probe data relative to the road segment to establish a multi-modal distribution of probe data representing a distance of the probe data from a predefined reference position of the road segment may include: dividing the road segment into a plurality of road sub-segments; and for each road sub-segment, analyzing the probe data relative to the road sub-segment to establish a multi-modal distribution of probe data representing a distance of the probe data from a predefined reference position of the road sub-segment. Analyzing the probe data relative to the road sub-segment to establish a multi-modal distribution of probe data representing a distance of the probe data from a predefined reference position of the road sub-segment may include: analyzing each road sub-segment using a multimodal distribution clustering algorithm and a series of different magnitude values to establish a number of lanes and a confidence value for each combination of road sub-segment and magnitude value; and establishing a number of lanes of the road segment based on a most represented value for the number of lanes from among all combinations of the road sub-segments and the magnitude values.

Embodiments provided herein may include an apparatus including: means for receiving probe data from a plurality of probes, where the probe data includes probe data points having location and heading; means for matching the probe data to a road segment to generate map-matched probe data; means for analyzing the probe data relative to the road segment to establish a multi-modal distribution of probe data representing a distance of the probe data from a predefined reference position of the road segment; means for determining a number of vehicle travel lanes of the road segment based on peaks in the established multi-modal distribution being associated with individual lanes; and means for providing the determined number of vehicle travel lanes and the associated road segment to a map services database for lane-level route guidance. The multi-modal distribution of probe data may be determined by a multimodality detection and clustering algorithm.

According to some embodiments, the means for analyzing the probe data relative to the road segment to establish a multi-modal distribution of probe data representing a distance of the probe data from a predefined reference position of the road segment may use a multimodality detection and clustering algorithm with a first magnitude parameter, and the apparatus may include means for analyzing the probe data relative to the road segment to establish a multi-modal distribution of probe data representing a distance of the probe data from a predefined reference position of the road segment using a second magnitude parameter, different from the first magnitude parameter. The means for matching the probe data to a road segment may include: means for dividing the road segment into sub-segments, where each sub-segment may be defined between two consecutive shape points; determining distances between each probe data point map-matched to the road segment and each of the sub-segments of the road segment; for each probe data point, means for selecting the shortest distance from among the distance between that probe data point and the sub-segments of the road segment; and means for determining a value for the shortest distance of each probe data point, where the shortest distance is positive in response to being disposed on a first side of the sub-segment and negative in response to being disposed on an opposite side of the sub-segment. The means for analyzing the probe data point relative to the road segment may include: means for generating a distribution of probe data points from the road segment, where the shortest distance from the road segment for each probe data point is a lane distance from the centerline of the road segment; and means for establishing multi-modal trends in the distribution of probe data points.

According to some embodiments, the means for analyzing the probe data relative to the road segment to establish a multi-modal distribution of probe data representing a distance of the probe data from a predefined reference position of the road segment may include: means for dividing the road segment into a plurality of road sub-segments; and for each road sub-segment, means for analyzing the probe data relative to the road sub-segment to establish a multi-modal distribution of probe data representing a distance of the probe data from a predefined reference position of the road sub-segment. The means for analyzing the probe data relative to the road sub-segment to establish a multi-modal distribution of probe data representing a distance of the probe data from a predefined reference position of the road sub-segment may include: means for analyzing each road sub-segment using a multimodal distribution clustering algorithm and a series of different magnitude values to establish a number of lanes and a confidence value for each combination of road sub-segment and magnitude value; and means for establishing a number of lanes of the road segment based on a most represented value for the number of lanes from among all combinations of the road sub-segments and the magnitude values.

BRIEF DESCRIPTION OF THE DRAWINGS

Figure 1:
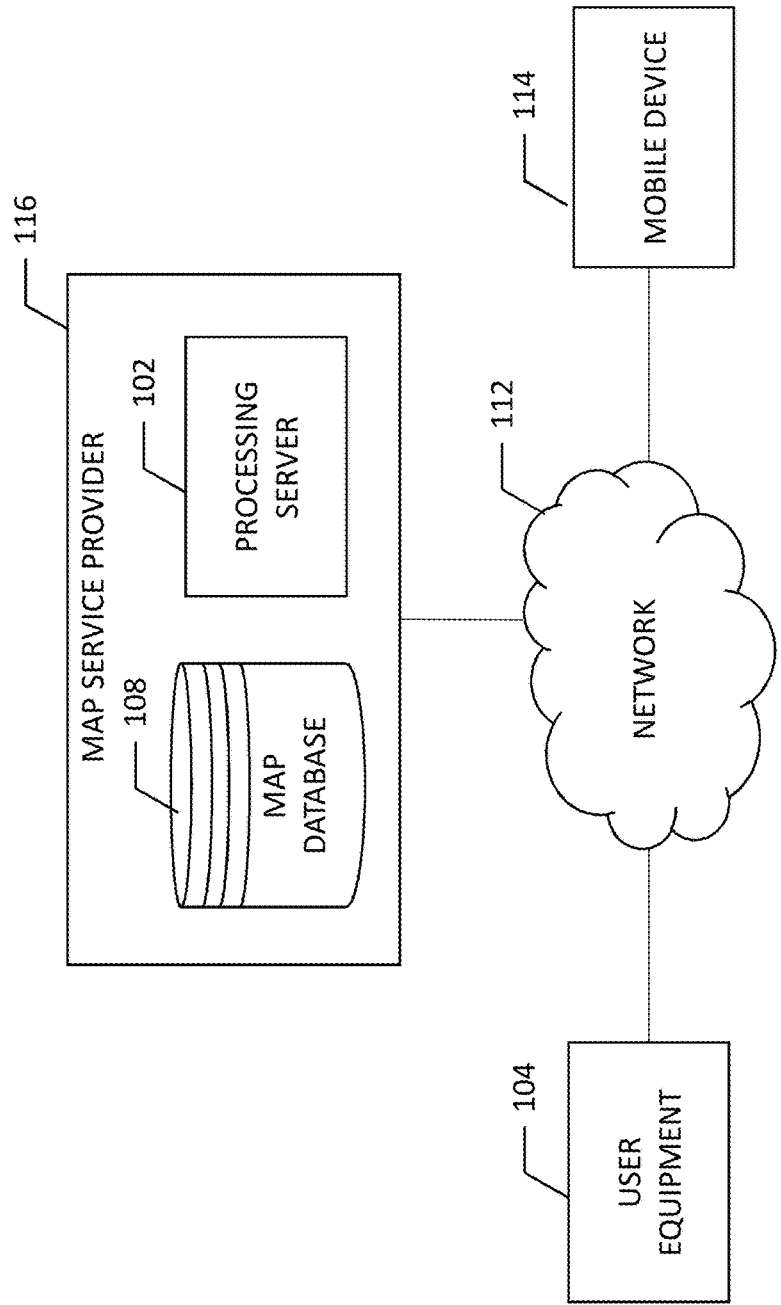
Figure 2:
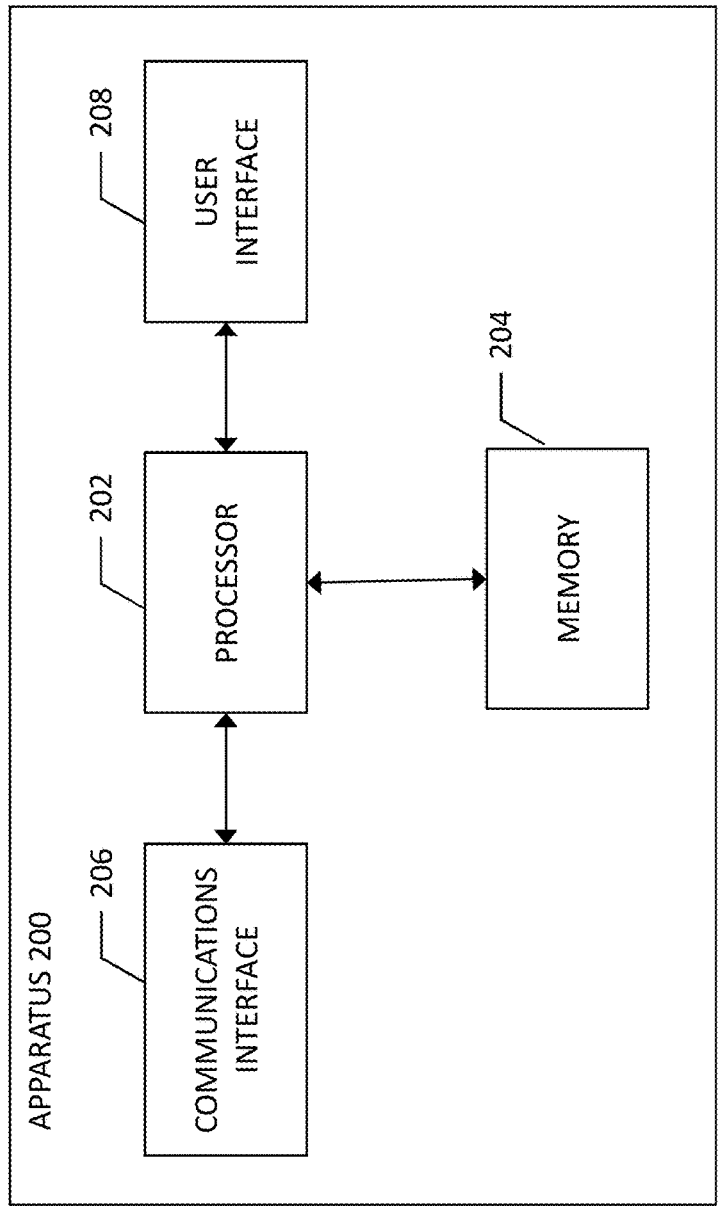
Figure 3:
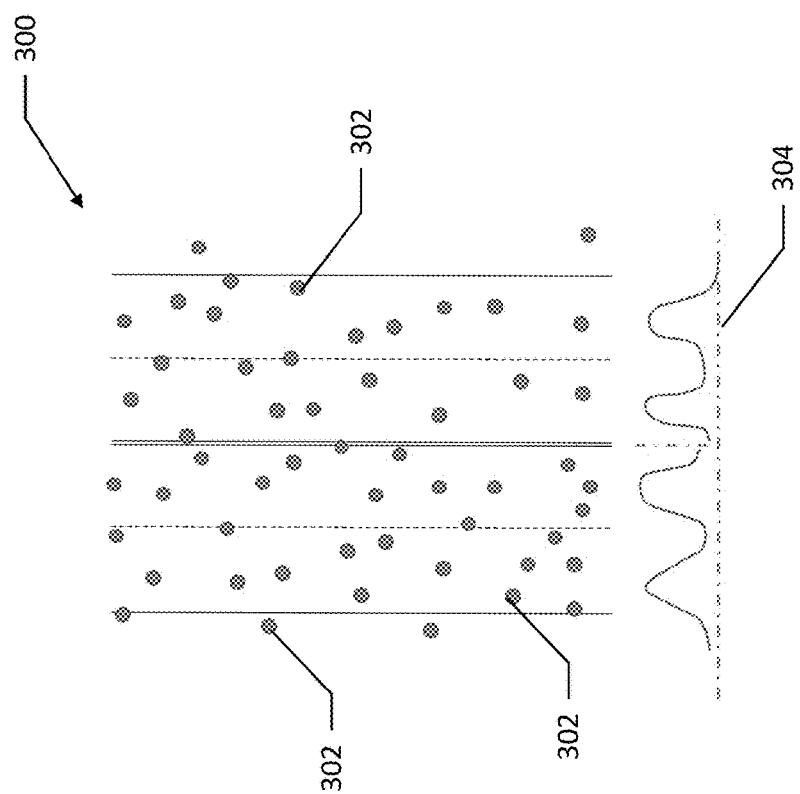
Figure 4:
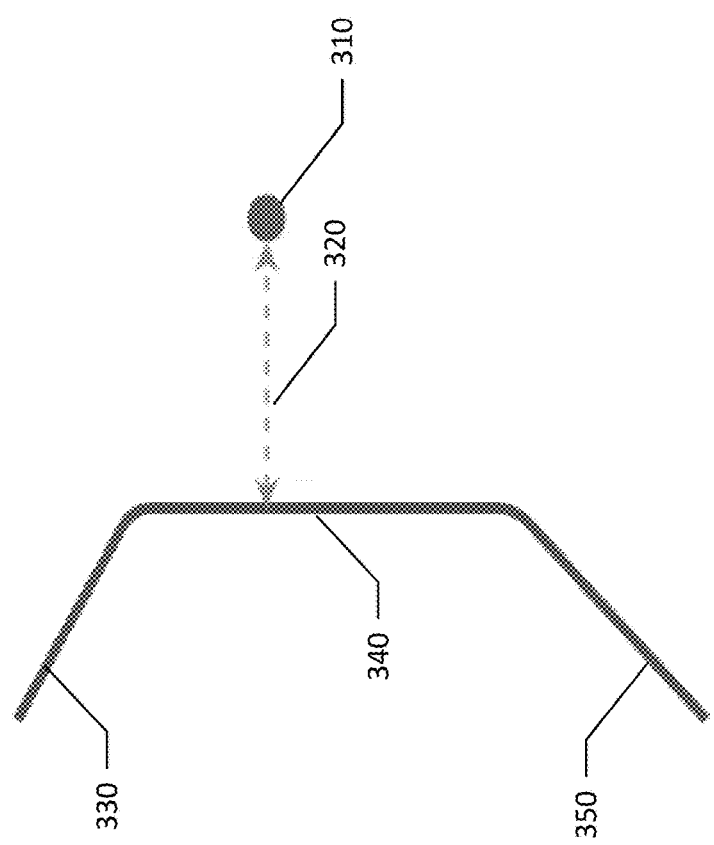
Figure 5:
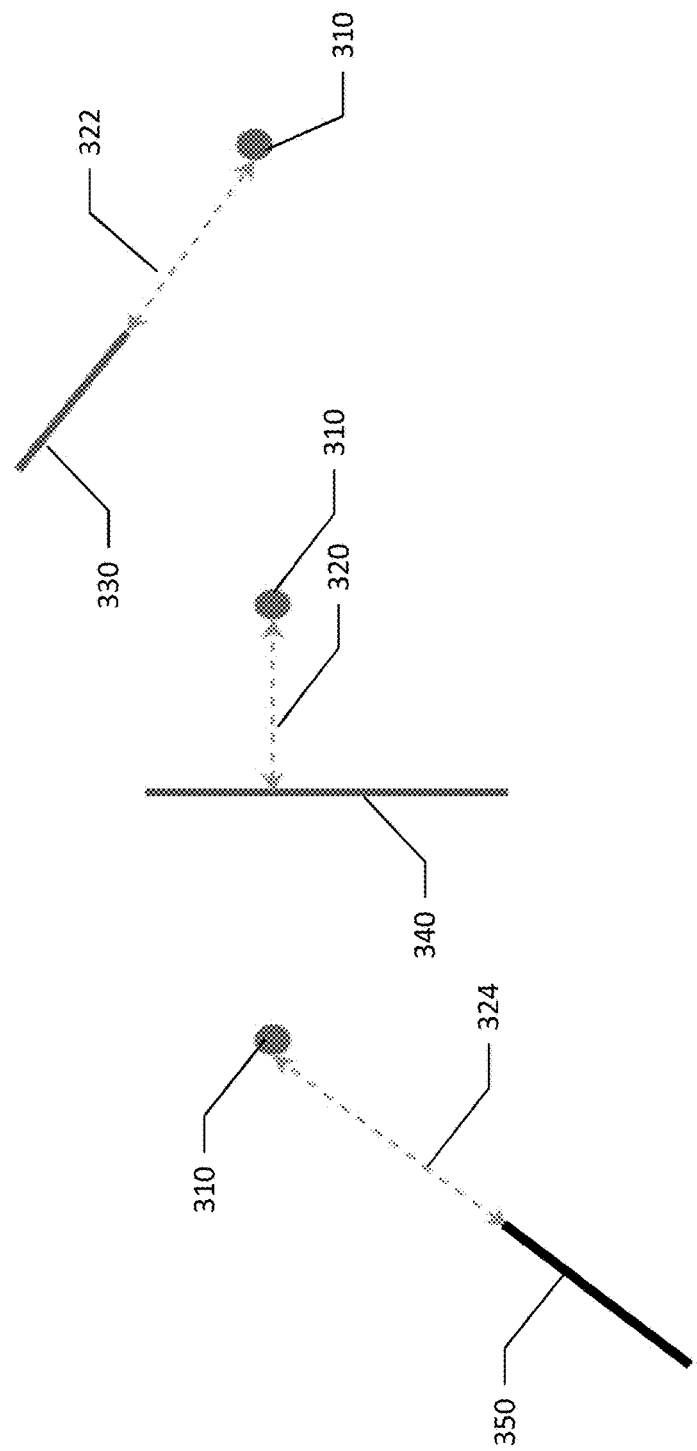
Figure 6:
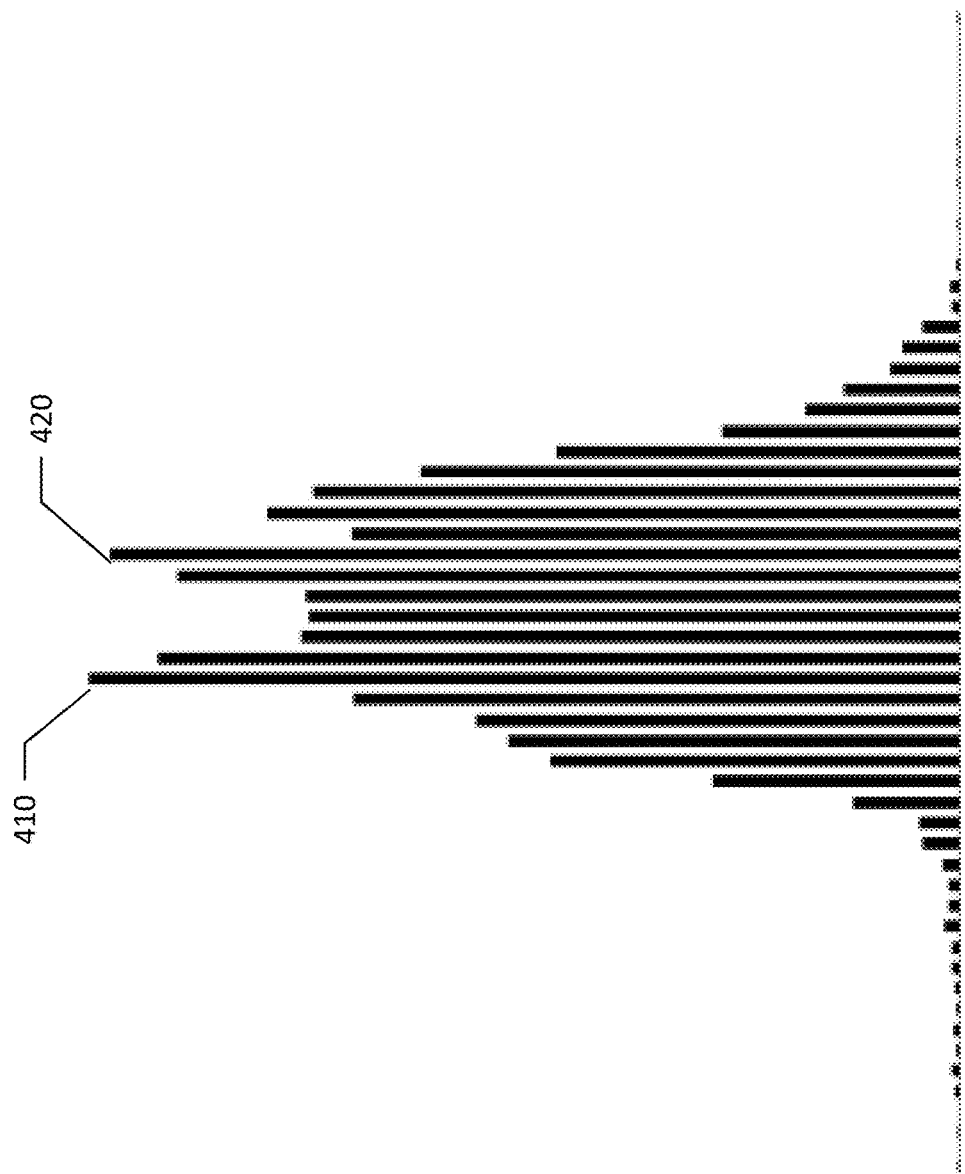
Figure 7:
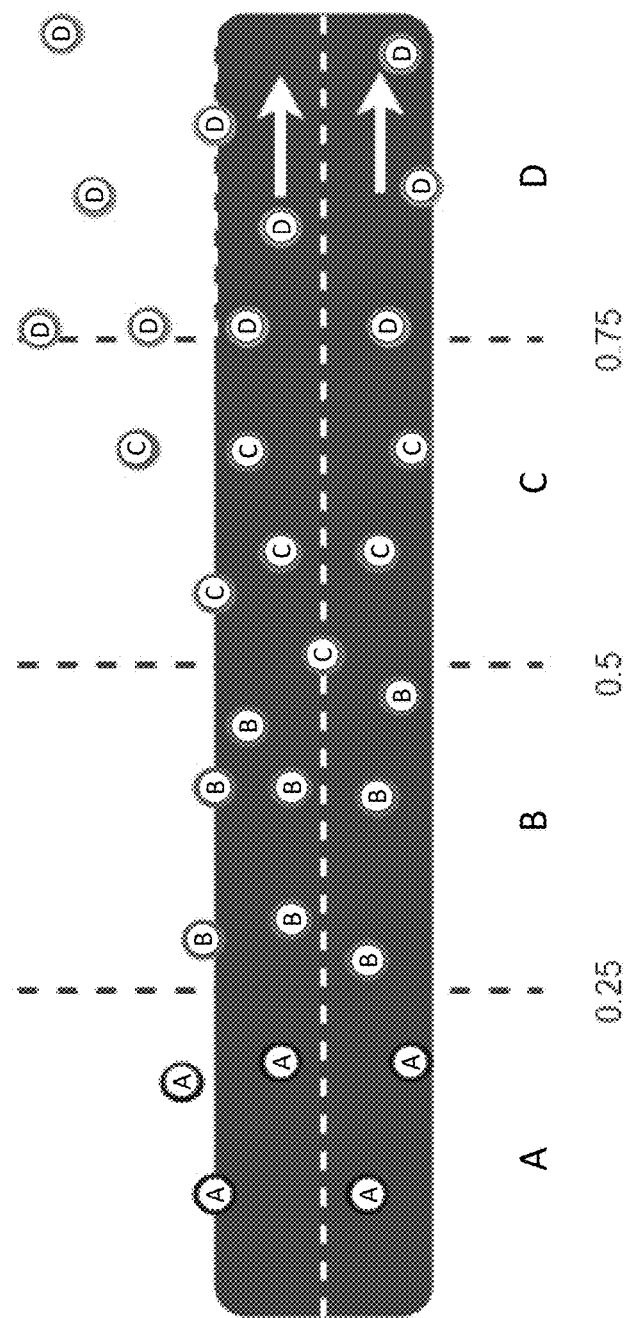
Figure 8:
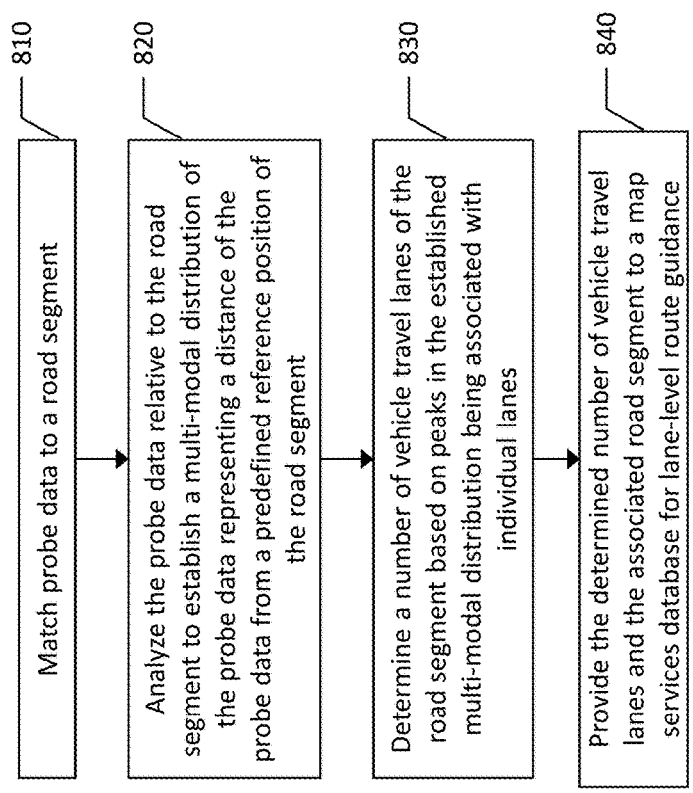

Having thus described example embodiments of the invention in general terms, reference will now be made to the accompanying drawings, which are not necessarily drawn to scale, and wherein:

FIG. 1 illustrates a communications diagram in accordance with an example embodiment;

FIG. 2 is a block diagram of an apparatus that may be specifically configured for determining a number of lanes along a road segment based on a received probe data in accordance with an example embodiment described herein;

FIG. 3 illustrates a depiction of a road segment including a plurality of probe data points and a multimodal distribution of the volume of probe data points relative to a predefined position on the road segment according to an example embodiment;

FIG. 4 illustrates a probe data point disposed a lane distance from a road segment according to an example embodiment;

FIG. 5 illustrates the probe data point of FIG. 4 and the associated distance from each sub-segment of the road segment according to an example embodiment of the present invention;

FIG. 6 depicts a multi-modal distribution of probe data points along a road segment according to an example embodiment;

FIG. 7 illustrates a road segment and associated probe data divided into sub-segments with their respective associated probe data according to an example embodiment described herein; and FIG. 8 is a flowchart of a method for estimating the number of vehicle travel lanes along a road segment according to an example embodiment described herein.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

A method, apparatus, and computer program product are provided herein in accordance with an example embodiment for determining the number of vehicle travel lanes for a plurality of lanes along a road segment. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

In an example embodiment, the geographic map database 108 may be presented according to a hierarchical or multi-level tile projection. More specifically, the geographic database may be defined according to a normalized Mercator projection or another type of projection. A map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest level of zoom) may be divisible into four cells or rectangles. Each of those cells may be, in turn, divisible into four cells, and so on until the highest level of zoom of the projection is reached.

According to an example embodiment, the map tile grid may be numbered in a systematic fashion to define a tile identifier (tile ID). For example, the top left tile may be numbered "00", the top right tile may be numbered "01", the bottom left tile may be numbered "10", and the bottom right tile may be numbered "11". In one embodiment, each cell may be divided into four rectangles and numbered by concatenating the parent tile ID and the new tile position. A variety of numbering schemes may also be possible. Any number of levels within increasingly smaller geographic areas may represent the map tile grid. Any level (n) of the map tile grid may have $2(n+1)$ cells. Accordingly, any tile of the level (n) has a geographic area of $A/2(n+1)$, where A is the total geographic area of the world or the total area of the map tile grids. Using the aforementioned numbering system or a similar nomenclature, the exact position of any tile in any level of the map tile grid or projection may be uniquely determined from the tile ID.

According to some embodiments, the system may identify a tile by a quadkey determined based on the ID of a tile of the map tile grid. The quadkey, for example, may be a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeros may be inserted or retained regardless of the level of the map tile grid in order to maintain a constant length for the one-dimensional array of the quadkey. In another example, the length of the one-dimensional array of the quadkey may indicate the corresponding level within the map tile grid. In one embodiment, the quadkey may be an example of the hash or encoding scheme of the respective geographical coordinates of a geographical data point that can be used to identify a tile in which the geographic data point is located.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for revising map geometry based on probe data received over two different periods of time. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by processing server 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases be configured to implement an example embodiment of the present invention on a single "system on a chip." As such, in some cases, a chip or chipset may constitute a means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for determining a number of vehicle travel lanes along a road segment from probe data (e.g., from mobile device 114) from a plurality of vehicles traveling along the road segment on one or more roadways in a particular geographic region. In order to produce and display more effective digital maps and accurate lane-level route guidance, particularly with the advent of autonomous vehicles, the geographic map databases must be built with knowledge of the number of lanes of road segments in each direction of travel. Geographic map databases may cover the vast majority of roads in a road network of developed countries; however, most of those roads lack an accurate determination of the number of lanes for their road segments. Methods using GPS sensor data may be prone to error such that the number of vehicle travel lanes cannot be properly discerned from the GPS sensor data. Gathering of vehicle travel lane information may be performed using light detection and ranging (LIDAR) or imagery gathered from camera enabled vehicles traveling along a road segment. However, these methods require vast resources of adequately equipped vehicles traversing each road segment of a road network, which is an inadequate solution due to the cost, scale, and dynamic nature of road networks.

The term "roads" or "road segments" as used herein, may refer to any path a vehicle may take in moving from one place to another. Roadways may be paved, improved roadways, gravel roadways, dirt trails, or the like, such that roadways does not imply that the mapped roads are necessarily recognized as county, state, or federally maintained roads, and may include private roadways such as access roads, neighborhood streets, and the like.

Example embodiments described herein provide a mechanism to establish the number of vehicle travel lanes along a road segment using statistical analysis of vehicle probe data. Embodiments may analyze the distribution of probes along a virtual cross-section of the road, looking for "gaps" in the distribution that represent the real-world gap between two lanes. An algorithm is provided that can detect multiple modalities in a distribution to detect these gaps, count them, and return an estimated number of lanes based on the number of modalities.

For purposes of determining a number of vehicle travel lanes along a road segment, it may be desirable to identify a position of a particular apparatus or probe. Such a position may also be used to determine a specific lane along a road segment a vehicle is traveling once the number of lanes have been established, and to support various navigation operations, routing functionality, assisted-driving technology, and/or the like. In such circumstances, an apparatus may use the Global Positioning System (GPS), the Global Navigation Satellite System (GLONASS), the Galileo satellite system, any satellite-based positioning system, and/or the like. GPS is a space-based satellite navigation system that provides location and time information in all weather conditions, anywhere on or near the earth, and where there is an unobstructed line of sight to four or more GPS satellites. Each GPS satellite continually broadcasts a signal that includes various GPS data. Such GPS data may include, for example, a pseudorandom code that is known to the receiver. By time-aligning a receiver-generated version and the receiver-measured version of the code, the time of arrival (TOA) of a defined point in the code sequence, called an epoch, can be found in the receiver clock time scale. Additionally, the GPS data may include the time of transmission (TOT) of the code epoch and the satellite position at that time. An apparatus, such as a GPS receiver, measures the TOAs, according to its own clock, of four satellite signals. Based on the TOAs and the TOTs, the apparatus calculates four or more time of flight (TOF) values. The apparatus may then compute its three-dimensional position and clock deviation from the four or more TOFs. The three-dimensional position is often a set of three-dimensional Cartesian coordinates with origin at the earth's center. To facilitate use of this three-dimensional position, the earth-centered solution location may be converted to latitude, longitude, and altitude.

Even though the example embodiments described herein relate generally to GPS, GPS data, GPS satellites, and/or the like, it should be understood that any satellite-based positioning system may be used. For example, any data from any satellite-based positioning system and any satellites associated with any satellite-based positioning system may be used. For example, the apparatus may receive GLONASS data from at least one GLONASS satellite, may receive Galileo data from at least one Galileo satellite, and/or the like. In such examples, the apparatus may determine a measured satellite pseudo-range for each GLONASS satellite of a plurality of GLONASS satellites, for each Galileo satellite of the plurality of Galileo satellites, and/or the like.

Real time data of vehicular traffic is increasingly being collected, aggregated, processed, analyzed, stored, and/or the like. Such real time data may include information indicative of the speed of a vehicle, the location of a vehicle, the time the data was collected, and/or the like. For example, a particular data point within a set of real time data may indicate the speed of a vehicle at a particular location during a particular time period. Data points within a set of real time data may be referred to as probe data. Such probe data may, for example, be collected to create speed-vs-time curves, historical traffic models, to perform real time traffic analysis, to create forward-looking traffic predictions, and/or the like. Probe data may be collected from vehicle-mounted sensors, GPS-enabled devices (e.g. smart phones), road sensors, traffic cameras, traffic reports, witnesses, and/or the like. Probe data may be centrally collected and distributed, broadcast, and/or the like to various receivers, subscribers, and/or the like (e.g. via a wireless network), such as to mobile navigation systems, portable navigation systems, news organizations, electronic road signs, and/or the like. Alternatively or additionally, probe data may be collected by an apparatus, such as a mobile navigation system, a portable navigation system, a traffic reporting system, and/or the like for use by the apparatus. For example, a GPS system installed in a vehicle may record the position and speed of the vehicle at particular intervals (e.g. once every second) for use by the vehicle, the GPS system, and/or the like, road sensors may record the speed and time of vehicles as they pass a particular position, and transmit the data over a cellular data connection for reporting to a subscription service, and/or the like. It will be appreciated that probe data collected by vehicle mounted sensors, road sensors, GPS-enabled devices, and/or the like may be distributed via wireless peer-to-peer or mesh-based networks, e.g. the data is passed from a source and then from vehicle to vehicle, each navigation system within a vehicle being both a consumer of the data and a repeater thereof. For example, probe data collected from vehicle-mounted sensors may be shared between vehicles by way of a vehicular ad hoc network, similar as described in the Institute of Electrical and Electronics Engineers (IEEE) 802.11 and 802.16 standards.

When probe data is received (e.g. from a service provider, from a sensor, and/or the like), the probe data may not be associated with a particular road segment or link segment. In circumstances where received probe data is not associated with a road segment, it may be desirable to match probe data to road segments on a map. For instance, the probe data may not identify a reference to a particular road segment, but use of the probe data for analysis, traffic reporting, and/or the like may be facilitated by associating the probe data with a particular road segment. For example, creation of a historical traffic model may be facilitated by associating probe data with a particular road segment. A historical traffic model may refer to a model of traffic behavior over time based, at least in part, on historical traffic data or probe data along one or more road segments. For example, a historical traffic model may model the volume of traffic or probes along a particular road segment at various times of the day based, at least in part, on data collected at similar times of day over an extended period of time, may model the location of a particular vehicle as the vehicle travels along a route based, at least in part, on data collected while the vehicle travels along the route, and/or the like.

Probe data may be matched to a road segment on a map using a number of known methods. For example, a computer program may be used that associates location information comprised by particular probe data with particular road segments. For instance, probe data may include a position received from a GPS receiver, and the GPS coordinates may be utilized by the computer program to determine a corresponding road segment. In another example, probe data may be manually associated with road segments, though a manual approach may be labor intensive, insufficiently fast, and/or the like. It should be understood that a road segment may be unidirectional (e.g. traffic flows in one direction), bi-directional (e.g. traffic flows in two directions), comprise multiple lanes, and/or the like. In circumstances where the road segment is bi-directional and/or comprises multiple lanes, it may be desirable to match probe data to a road segment according to the direction of traffic flow, the lane associated with the probe data, and/or the like. For example, if the road segment is bi-directional, it may be desirable to only match probe data to the road segment associated with traffic flow in one direction, to divide the road segment into multiple road segments (e.g. each flow direction is a different road segment, each lane of a road is a single road segment, etc.), and/or the like. In this manner, probe data matched to the road segment may be limited to probe data that is indicative of the same direction of travel, indicative of probe data associated with a single lane of a road, and/or the like.

Certain embodiments described herein build a vehicle travel lane database for roads on a network of roads. This vehicle travel lane database is generated by analyzing the multi-modal distribution embedded in probes on a road segment, both in the spatial and temporal (or speed) dimension. Probes can be categorized into different lane clusters. Certain embodiments can facilitate the automatic detection of the number of lanes on a road segment where lanes may not be known to the map services provider 116.

Algorithms described herein may use historical probe data retrieved from a database, where the probes are map-matched but retain their raw position that was used for the map-matching in order to calculate the spatial distances from a centerline of the road for lane-level granularity. According to the methods described herein, probe data that is collected may be map-matched as described above. Once map-matched to a road segment, the probe data, using the raw position data, analysis may be performed to establish the number of vehicle travel lanes along the road segments. In order to establish the number of vehicle travel lanes along the road segments, the probe data must be analyzed for a spatial distribution around the road segment to elicit the lane location using a multi-modality approach. Once the number of vehicle travel lanes for a road segment has been established, the lane-level data for the road segment may be stored, such as at a map service provider 116 in map database 108, for use with lane-level route guidance, lane-level vehicle speed analysis, autonomous vehicle control, or any such application that benefits from the granularity provided by a number of lanes for a road segment.

FIG. 3 illustrates an example embodiment of how a spatial pattern for vehicle lane patterns are obtained. The vehicle lane pattern is the multi-modal pattern obtained from the spatial distribution of probes on a virtual cross-section of the road segment. Although GPS probes inherently include locationing errors that could place the probes anywhere within a fifteen to twenty meter radius, the specific lane a vehicle is traversing still has an indirect influence on the final GPS position despite error. The spatial distribution of a large population of probes on the road segment produces a histogram with multiple peaks (multi-modality) that is an indirect indication of the road lanes as depicted in FIG. 3. As shown, the probe data points 302 collected along road segment 300 form a multi-modal distribution based on the volume of probe data points relative to a pre-defined reference position on the road segment (e.g., a centerline) depicted at 304. This multi-modal distribution presents an approximation of the road lanes of the road segment 300.

According to the embodiment of FIG. 3, the multi-modal distribution may be used to associate each probe data point 302 with a lane of the road segment 300. Using the probe data associated with each lane based on the modal clustering, the average speed of the probes may be determined to obtain an average speed for the lane of the road segment.

Probe data that is map-matched to a road segment may be analyzed to determine a lane to which that probe data is assigned. The lane distance is defined as the closest perpendicular distance from the probe data point raw position to a sub-segment of the road segment. The lane distance represents the distance of the probe data point from a predefined reference of the road segment, such as the centerline of the road segment. FIG. 4 depicts a graphical illustration of the determination of the lane distance of a probe data point. The lane distance may be computed through a series of geometrical formulas, where the coordinates are treated as if the points were in a two-dimensional space since the road segments and road sub-segments are generally short enough that elevation changes along the segment are generally minimal and inconsequential to the lane distance.

The lane distance may be calculated by first sub-dividing the road segment into a plurality of sub-segments, where each sub-segment is defined by a pair of consecutive shape points. Shape points may be, for example, distinct turns or bends in the road segment. Optionally, in the event a road segment or portion thereof is substantially straight, the sub-segments may be established based on a maximum length of a sub-segment. For each sub-segment, an algorithm may be used to calculate the lane distance for the probe. An example algorithm for determining the lane distance is shown below, where the probe data point and the sub-segment are defined as vectors, and the closest point to the probe data point on the line defined by the sub-segment is found through the use of the dot product. The output of the algorithm is the distance to the closest shape point of the sub-segment.

```
function distancePointFromSegment(p, seg1, seg2) {
    let aX = seg2.lng - seg1.lng;
    let aY = seg2.lat - seg1.lat;
    let bX = p.lng - seg1.lng;
    let bY = p.lat - seg1.lat;
    let dotProd = aX * bX + aY * bY;
    let sqDist = aX * aX + aY * aY;
    if (sqDist === 0) {
        return haversineDist (p, seg1);
    }
    let component = dotProd / sqDist;
    let closest = {lat: 0, lng:0};
    if (component <= 0) {
        closest = seg1;
    } else if (component >= 1) {
        closest = seg2;
    } else {
        closest.lng = seg1.lng + aX * component;
        closest.lat = seg1.lat + aY * component;
    }
    return haversineDist(p, closest);
}
```

FIG. 4 illustrates a road segment that is divided into three sub-segments 330, 340, and 350. The algorithm above is used to identify the lane distance 320 for probe data point 310. FIG. 5 illustrates a graphical representation of the algorithm process of breaking apart the sub-segments of the road segment and establishing the shortest distance between each sub-segment 330, 340, 350 and the probe data point 310. Based on the distances 320, 322, and 324, the shortest is 320 such that distance 320 becomes the lane distance for probe data point 310 from the road segment consisting of sub-segments 330, 340, and 350.

After computing the lane distance described above, the distance needs to be assigned a sign, positive or negative, based on a side of the road segment. According to certain embodiments, the distance may be assigned a positive value if disposed on a right side of the road segment, and a negative value if disposed on the left side of the road segment. The orientation of the road segment may be established based on the cardinal directions relative to the Earth, or based on a direction of travel of the probe data points, for example. Once each probe data point map-matched to the road segment has a signed lane distance, embodiments described herein may analyze the spatial distribution of the probe data points relative to the road segment.

The spatial distribution of probe data points on a road having multiple lanes may produce a multi-modal distribution, such as the multi-modal distribution of FIG. 6 with peaks 410 and 420 each representing a probable lane of the road segment. An algorithm of certain example embodiments may analyze the distribution to establish the multi-modal trends. The algorithm may be used to find multiple and consistent "peaks" in the distribution of the probe data points based on their lane distances. A peak in the distribution correlates to a higher number of probes with a similar lane distance, such that a lane may be determined as present at that lane distance from the predetermined reference point of the road segment. The multimodality detection and clustering (MDC) algorithm may be described as follows:

```
V ← {a vector or a list of values}
function MDC(V):
    s ← STD(V)
    m ← mean(V)
    V ← V ∀ V <m + 2s & V> m − 2s        // first outlier filtering
    R ← Range(V)
    d ← R/16
    for i ← 1 to 16                       // bucketizing
        b_i ← {V ∀ V <max(V) & V > (max(V) − d)}
        V ← V − b_i
    end for
    V ← b_1 + b_2 + b_16                  // restore V
    C ← 1
    for i ← 2 to 16                       // cluster search
```

$$MG \leftarrow \frac{mean(b_1) - mean(b_i)}{R}$$

```
    if |b_1| > 8 and MG > 0.3 and |V − b_1|>8   //8&0.3 are tuning
paramters
    then{
        MD ← {C,mean(b_i),size(b_i),STD(b_i),MG}
        C ← C + 1
        V ← V − b_1
        b_1 ← b_i
    }
    else b_1 ← b_1 + b_i
    end if
end for
MD ← {C,mean(b_1),size(b_1),STD(b_1)}
return MD
endMDC
```

The MDC algorithm returns ordered clusters of probes representing lane-level spatial differences which is a representation of the number of lanes on the road segment. This established vehicle lane pattern may be used to establish the number of vehicle travel lanes along a road segment by determining the modes of the multimodality detection clustering algorithm.

While the MDC algorithm may establish clusters of probes representing individual vehicle travel lanes, the algorithm may be preformed multiple times using multiple magnitude parameters to establish a confidence level with which the lanes have been identified. The MDC algorithm magnitude parameter "MG" may define how "strict" the algorithm is when evaluating if a cluster should be considered a lane. The higher the magnitude parameter, the lower the likely number of estimated lanes. In order to produce a confidence metric along with the number of lanes established and to maximize possible distinct observation points within error filled data, the MDC algorithm may be performed multiple times on each road segment (or sub-segment), each time using a different magnitude parameter or on a different subset of probes traversing the segment.

According to an example embodiment described herein, a road segment may be divided into a plurality of sub-segments, and the probe data points associated with the road segment may also be divided according to the sub-segment of the road segment to which they are associated. FIG. 7 illustrates such an example embodiment where a road segment is divided into four sub-segments A through D, and the probe data points associated with each segment are labeled A through D. Dividing a road segment into a plurality of sub-segments can help mitigate data errors, such as when location data is compromised by overpasses, buildings adjacent to the roadway, trees overhanging the roadway, etc. These sub-segments may each then be analyzed using different magnitude values for the MDC algorithm.

This matrix approach enables a confidence metric to be produced along with the result (i.e., the number of established lanes of a road sub-segment). The most represented value (or modal value) inside the matrix is established as the final result, while the confidence is the percentage of time that value has been predicted among all of the computations within the matrix. The computation matrix is illustrated below, where the MDC result is based on the magnitude parameter (0.15 through 0.19) and the sub-segment (SA through SD).

TABLE 1 computation matrix for a plurality of magnitude parameters for each sub-segment Calculating the MDC at each matrix cell produces a final output matrix resembling the following:

| Sub-Segment | Magnitude Parameter | | | | |
|---|---|---|---|---|---|
| | 0.15 | 0.16 | 0.17 | 0.18 | 0.19 |
| A | MDC (SA, 0.15) | MDC (SA, 0.16) | MDC (SA, 0.17) | . . . | . . . |
| B | MDC (SB, 0.15) | . . . | . . . | . . . | . . . |
| C | MDC (SC, 0.15) | . . . | . . . | . . . | . . . |
| D | . . . | . . . | . . . | . . . | . . . |

TABLE 2 output from the computation matrix of Table 1

| Sub-Segment | Magnitude Parameter | | | | |
|---|---|---|---|---|---|
| | 0.15 | 0.16 | 0.17 | 0.18 | 0.19 |
| A | <number_lanes, confidence> | <number_lanes, confidence> | <number_lanes, confidence> | . . . | . . . |

TABLE 2-continued output from the computation matrix of Table 1

| Sub-Segment | Magnitude Parameter | | | | |
| --- | --- | --- | --- | --- | --- |
| | 0.15 | 0.16 | 0.17 | 0.18 | 0.19 |
| B | <number_lanes, confidence> | ... | ... | ... | ... |
| C | <number_lanes, confidence> | ... | ... | ... | ... |
| D | ... | ... | ... | ... | <number_lanes, confidence> |

This method of establishing the number of lanes for a road segment is more efficient and can be generated with fewer data points than conventional methods, and considerably more accurate than using the naïve set theory. The methods described herein is particularly effective due to the ability to perform well and with relatively high accuracy over existing methods using relatively few probes (e.g., as few as 8 probes).

FIG. 8 illustrates a flowchart depicting a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 8 illustrates a flowchart of a method according to an example embodiment of the present invention for determining a number of vehicle travel lanes of a road segment. As shown, probe data from a plurality of vehicle probes is matched to a road segment at 810. The probe data is analyzed relative to the road segment to establish a multi-modal distribution of the probe data representing a distance of the probe data from a predefined reference position of the road segment at 820. A number of vehicle travel lanes of the road segment is determined at 830 based on peaks in the established multi-modal distribution being associated with individual lanes. At 840, the determined number of vehicle travel lanes and the associated road segment are provided to a map services database for lane-level route guidance.

In an example embodiment, an apparatus for performing the method of FIG. 8 above may comprise a processor (e.g., the processor 202) configured to perform some or each of the operations (810-840) described above. The processor may, for example, be configured to perform the operations (810-840) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 810-840 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A map services provider system comprising:
   a memory configured to receive probe data points from a plurality of probes, wherein the probe data comprises heading information and location information for each probe data point; and processing circuitry configured to:
  match the probe data to a road segment to generate map-matched probe data;
  divide the road segment into sub-segments;
  determine distances between each probe data point map-matched to the road segment and a point on each of the sub-segments of the road segment that is closest to the probe data point;
  for each probe data point, select the shortest distance from among the distances between that probe data point and the point closest to that probe data point on the sub-segments of the road segment;
  determine a value for the shortest distance of each probe data point;
  analyze the probe data relative to the road segment to establish a multi-modal distribution of probe data representing a distance of the probe data from a predefined reference position of the road segment;
  determine a number of vehicle travel lanes of the road segment based on peaks in the established multi-modal distribution being associated with individual lanes; and
  provide the determined number of vehicle travel lanes and the associated road segment to a map services database for lane-level route guidance.

2. The system of claim 1, wherein the multi-modal distribution of probe data is determined by a multimodality detection and clustering algorithm.

3. The system of claim 1, wherein the processing circuitry configured to analyze the probe data relative to the road segment to establish a multi-modal distribution of probe data representing a distance of the probe data from a predefined reference position of the road segment uses a multimodality detection and clustering algorithm with first magnitude parameter; and
  wherein the processing circuitry is further configured to:
    analyze the probe data relative to the road segment to establish a multi-modal distribution of probe data representing a distance of the probe data from a predefined reference position of the road segment using the multimodality detection and clustering algorithm with a second magnitude parameter, different from the first magnitude parameter.

4. The system of claim 1, wherein
  each sub-segment is defined between two consecutive shape points; and
  wherein the value for the shortest distance is positive in response to being disposed on a first side of the sub-segment and negative in response to being disposed on the opposite side of the sub-segment.

5. The system of claim 1, wherein the processing circuitry configured to analyze the probe data relative to the road segment comprises processing circuitry configured to:
  generate a distribution of probe data points from the road segment, wherein the shortest distance from the road segment for each probe data point is a lane distance from the centerline of the road segment; and
  establish multi-modal trends in the distribution of probe data points.

6. The system of claim 1, wherein the processing circuitry configured to analyze the probe data relative to the road segment to establish a multi-modal distribution of probe data representing a distance of the probe data from a predefined reference position of the road segment is further configured to:
  divide the road segment into a plurality of road sub-segments; and
  for each road sub-segment, analyze the probe data relative to the road sub-segment to establish a multi-modal distribution of probe data representing a distance of the probe data from a predefined reference position of the road sub-segment.

7. The system of claim 6, wherein the processing circuitry configured to analyze the probe data relative to the road sub-segment to establish a multi-modal distribution of probe data representing a distance of the probe data from a predefined reference position of the road sub-segment comprises processing circuitry configured to:
  analyze each road sub-segment using a multimodal distribution clustering algorithm and a series of different magnitude values to establish a number of lanes and a confidence value for each combination of road sub-segment and magnitude value; and
  establish a number of lanes of the road segment based on a most represented value for the number of lanes from among all combinations of the road sub-segments and the magnitude values.

8. An apparatus comprising at least one processor and at least one memory including computer program code, the at least one memory and computer program code configured to, with the processor, cause the apparatus to at least:
  receive probe data from a plurality of probes, wherein the probe data comprises location and heading;
  match the probe data to a road segment to generate map-matched probe data comprising a plurality of map-matched probe data points;
  divide the road segment into a plurality of sub-segments, wherein each sub-segment comprises a predefined reference position;
  determine, for each probe data point, a lane distance from the probe data point to the predefined reference position of each of the plurality of sub-segments;
  establish, for each probe data point, a shortest lane distance as the probe data point lane distance for the respective probe data point relative to the road segment;
  analyze the probe data relative to the road segment to generate a multi-modal distribution of the probe data points representing a distance of the probe data from the respective predefined reference position of the road segment based on the probe data point lane distance for each probe data point;
  determine a number of vehicle travel lanes of the road segment based on the probe data point lane distance from the predefined reference and the multi-modal distribution; and
  provide the determined number of vehicle travel lanes and the associated road segment to a map services database for lane-level route guidance.

9. The apparatus of claim 8, wherein causing the apparatus to match each probe data point to an individual lane of the road segment based on the lane distance from the predefined reference and the multi-modal distribution comprises establishing individual lanes of the road segment based on the peaks of the multi-modal distribution using a multimodality detection and clustering algorithm.

10. The apparatus of claim 8, wherein causing the apparatus to divide the road segment into a plurality of sub-segments comprises dividing the road segment into a plurality of sub-segments, where each sub-segment is defined between two consecutive shape points along the road segment.

11. The apparatus of claim 8, wherein causing the apparatus to analyze the probe data relative to the road segment to establish a multi-modal distribution of probe data representing a distance of the probe data from a predefined reference position of the road segment uses a multimodality detection and clustering algorithm with first magnitude parameter; and wherein the apparatus is further caused to:
analyze the probe data relative to the road segment to establish a multi-modal distribution of probe data representing a distance of the probe data from a predefined reference position of the road segment using the multimodality detection and clustering algorithm with a second magnitude parameter, different from the first magnitude parameter.

12. The apparatus of claim 8, wherein causing the apparatus to analyze the probe data relative to the road segment to establish a multi-modal distribution of probe data representing a distance of the probe data from a predefined reference position of the road segment comprises:

for each road sub-segment, analyze the probe data relative to the road sub-segment to establish a multi-modal distribution of probe data representing a distance of the probe data from a predefined reference position of the road sub-segment.

13. The apparatus of claim 12, wherein causing the apparatus to analyze the probe data relative to the road sub-segment to establish a multi-modal distribution of probe data representing a distance of the probe data from a predefined reference position of the road sub-segment comprises causing the apparatus to:

analyze each road sub-segment using a multimodal distribution clustering algorithm and a series of different magnitude values to establish a number of lanes and a confidence value for each combination of road sub-segment and magnitude value; and establish a number of lanes of the road segment based on a most represented value for the number of lanes from among all combinations of the road sub-segments and the magnitude values.

14. A method comprising:
receiving probe data from a plurality of probes, wherein the probe data comprises probe data points having location and heading;

matching the probe data to a road segment to generate map-matched probe data;

dividing the road segment into sub-segments;

determining distances between each probe data point map-matched to the road segment and a point on each of the sub-segments of the road segment that is closest to the probe data point;

for each probe data point, selecting the shortest distance from among the distances between that probe data point and the point closest to that probe data point on the sub-segments of the road segment;

determining a value for the shortest distance of each probe data point;

analyzing the probe data relative to the road segment to establish a multi-modal distribution of probe data representing a distance of the probe data from a predefined reference position of the road segment;

determining a number of vehicle travel lanes of the road segment based on peaks in the established multi-modal distribution being associated with individual lanes; and providing the determined number of vehicle travel lanes and the associated road segment to a map services database for lane-level route guidance.

15. The method of claim 14, wherein the multi-modal distribution of probe data is determined by a multimodality detection and clustering algorithm.

16. The method of claim 14, wherein analyzing the probe data relative to the road segment to establish a multi-modal distribution of probe data representing a distance of the probe data from a predefined reference position of the road segment uses a multimodality detection and clustering algorithm with first magnitude parameter;

the method further comprising:
analyzing the probe data relative to the road segment to establish a multi-modal distribution of probe data representing a distance of the probe data from a predefined reference position of the road segment using the multimodality detection and clustering algorithm with a second magnitude parameter, different from the first magnitude parameter.

17. The method of claim 14, wherein
each sub-segment is defined between two consecutive shape points; and wherein the value for the shortest distance is positive in response to being disposed on a first side of the sub-segment and negative in response to being disposed on the opposite side of the sub-segment.

18. The method of claim 14, wherein analyzing the probe data relative to the road segment comprises:

generating a distribution of probe data points from the road segment, wherein the shortest distance from the road segment for each probe data point is a lane distance from the centerline of the road segment; and establishing multi-modal trends in the distribution of probe data points.

19. The method of claim 14, wherein analyzing the probe data relative to the road segment to establish a multi-modal distribution of probe data representing a distance of the probe data from a predefined reference position of the road segment comprises:

dividing the road segment into a plurality of road sub-segments; and for each road sub-segment, analyzing the probe data relative to the road sub-segment to establish a multi-modal distribution of probe data representing a distance of the probe data from a predefined reference position of the road sub-segment.

20. The method of claim 19, wherein analyzing the probe data relative to the road sub-segment to establish a multi-modal distribution of probe data representing a distance of the probe data from a predefined reference position of the road sub-segment comprises:

analyzing each road sub-segment using a multimodal distribution clustering algorithm and a series of different magnitude values to establish a number of lanes and a confidence value for each combination of road sub-segment and magnitude value; and establishing a number of lanes of the road segment based on a most represented value for the number of lanes from among all combinations of the road sub-segments and the magnitude values.

\* \* \* \* \*